Dec. 30, 1958 CARL-GEORG PAUL AURELL 2,866,894
DEVICE FOR DEMODULATING DURATION MODULATED PULSES
Filed Aug. 19, 1953 2 Sheets-Sheet 1

INVENTOR
CARL-GEORG PAUL AURELL
BY [signature]
ATTORNEY

DEVICE FOR DEMODULATING DURATION MODULATED PULSES

Filed Aug. 19, 1953 2 Sheets-Sheet 2

INVENTOR
CARL-GEORG PAUL AURELL
BY
ATTORNEY

United States Patent Office 2,866,894

Patented Dec. 30, 1958

2,866,894

DEVICE FOR DEMODULATING DURATION MODULATED PULSES

Carl-Georg Paul Aurell, Stockholm, Sweden, assignor to Telefonaktiebolaget L M Ericsson, Stockholm, Sweden, a corporation of Sweden Application August 19, 1953, Serial No. 375,227

Claims priority, application Sweden September 2, 1952

3 Claims. (Cl. 250—27)

Figure 1:
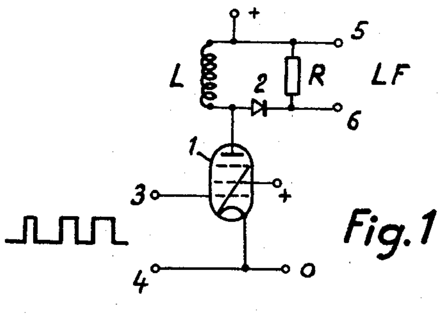

This invention relates to a device for demodulating duration modulated pulses.

In pulse communication systems the pulses are often modulated with respect to the duration or the time position of the pulses. In order to restore the initial modulation signal in the latter case the time position modulated pulses are usually converted into duration modulated pulses which pulses then are demodulated.

The component of the frequency spectrum of a duration modulated pulse train, the frequency of which component is equal to the modulation frequency, has an amplitude, which is proportional to the amplitude of the initial modulation signal. This property of the frequency spectrum may be utilized by simply filtering out said component.

When demodulating duration modulated pulses these are generally fed from the plate of an amplifier tube through a filter circuit to a load circuit. It is not desirable to have a greater amplifier tube than necessary for obtaining the desired low frequency output in the load circuit without exceeding the maximum allowed distortion. Therefore the device ought to be dimensioned with as good an efficiency as possible.

For a better utilization of the pulse effect delivered by the amplifier tube, the plate of said tube is often connected to a storing circuit consisting of a condenser. However the impedance of the load circuit will be rather high when said circuit is dimensioned for obtaining maximum low frequency output. In many cases this may be of great disadvantage especially when using such tubes, which comprise a great number of plates, i. e. trochotrons and similar tubes, where circuits of high impedance connected to the plates may cause too great a crosstalk between the different channels because of interelectrode capacities.

This invention relates to a device for demodulating duration modulated pulses in which device a coil is connected between a plate of a tube with pentode properties and the plate voltage source, which coil is shunted by a series connection consisting of a diode and a load impedance, said diode being so connected that the diode is non-conducting during the appearance of a duration modulated pulse at said plate.

The invention is characterized by the inductance of said coil being approximately equal to or somewhat greater than $\tau R_m$, where $\tau$ is equal to the maximum duration of a pulse and $R_m$ is the internal pulse resistance of the electron tube, said resistance being defined as the ratio between the voltage interval, within which the electron tube is intended to operate and within which the current to the plate is constant, and the current to the plate, and further characterized by the resistance of said load impedance being greater than $3.p.R_m$, where $p$ is the pulse ratio for pulses of maximum duration.

In this case the first mentioned storing circuit thus consists of a coil. The optimum impedance of the load circuit will then be rather low, which in many cases will be of great advantage as is mentioned before.

Figure 2:
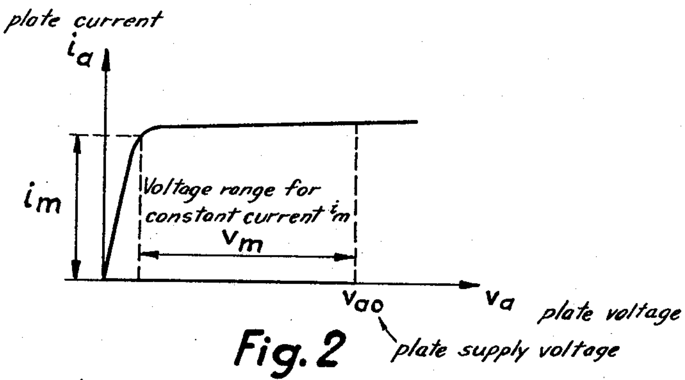
Figure 3:
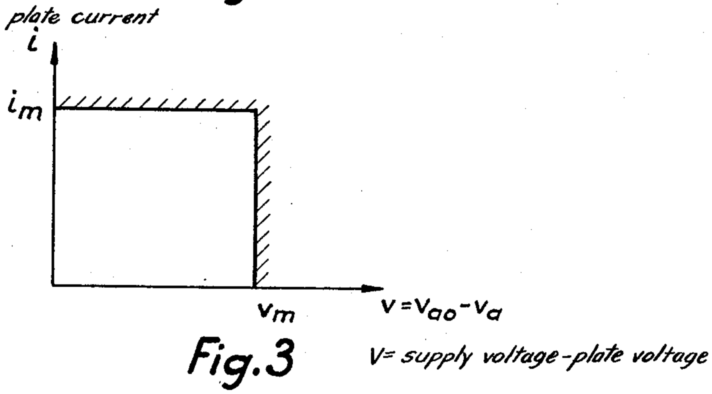
Figure 4:
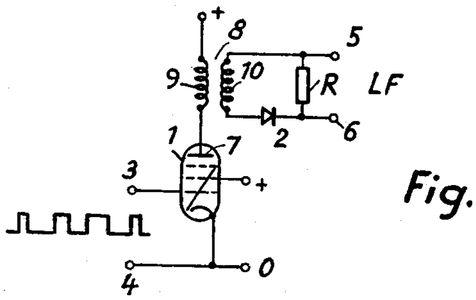
Figure 5:
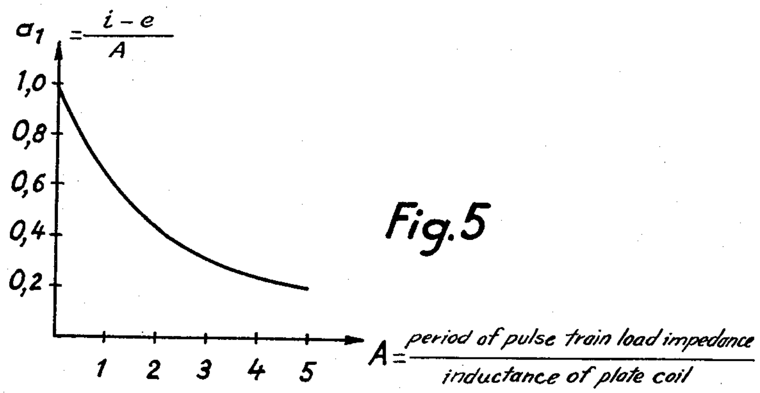

The invention will be closer described in connection with the attached drawing, where Fig. 1 shows an embodiment of a device according to the invention, Fig. 2 shows a plate-current-plate-voltage diagram of a tube with pentode properties, Fig. 3 shows such a current-voltage diagram in an idealized form, Fig. 4 shows another embodiment of a device according to the invention and Fig. 5 shows a diagram, by the help of which devices according to the invention may be dimensioned.

In Fig. 1 a tube with pentode properties is indicated by 1, i. e. its plate current is almost independent of the plate voltage, when this exceeds a certain value, but approaches zero rapidly, when the plate voltage drops below said value.

Fig. 2 shows the well-known characteristic of the plate $i_a$ as a function of the plate voltage $v_a$ of such a tube. The plate supply voltage is indicated by $V_{ao}$. The plate voltage of the tube may decrease with the value $v_m$ without the plate current of the tube being appreciably decreased. The plate current of the tube at a plate voltage of $V_{ao}-v_m$ is indicated by $i_m$.

For calculating the optimum dimensioning of a device according to the invention it may be suitable to use an idealized plate-current-plate voltage characteristic of the tube according to Fig. 3, where $v=V_{ao}-v_a$.

I put:

$$P_m=v_m i_m$$

and $$R_m=\frac{v_m}{i_m}$$

These values may be considered to characterize the tube from the pulse point of view, when the supply voltages are given. $P_m$ is the available pulse peak (or instantaneous) power and $R_m$ is the "internal pulse resistance."

In the following the (maximum) pulse duration $\tau$ may be supposed to be negligible in comparison to the time distance T between two successive pulses.

In Fig. 1 the storing circuit consists of the coil L and the load circuit consists of the resistor R. The duration modulated pulses are applied to the grid of the tube 1 from the terminals 3 and 4, and the demodulated signal is obtained from the terminals 5 and 6 across the load circuit R. Suppose firstly that the coil L and the resistor R are directly connected in parallel, i. e. that the diode 2 is short-circuited. During the duration $\tau$ of a pulse the voltage $v$ across the circuit is supposed to be constant and equal to $v_m$ and therefore the current through the coil will be $$i=i(0)+\frac{v_m}{L}\cdot t$$

$i(0)$ being the residual current through L at the time $t=0$ from preceding pulses. As will be shown below, the circuit is dimensioned so that $R<R_m$ and the current through R during the duration of the pulse will be very great and occupies during the duration of the pulse the greatest part of the available current swing $i_m$ (the coil will short-circuit the direct current component).

If, however, a diode 2 is inserted in series with the resistor R according to Fig. 1, and the diode is coupled in such a manner as to prevent current from passing R during the duration of the pulse, the current through the coil at the end of the pulse will be:

$$i(\tau)=i(0)+\frac{v_m\cdot\tau}{L}$$

the maximum allowed value of $i(\tau)$ being $i_m$.

The discharge of the current through the coil occurs according to:

$$i=i(\tau)\cdot e^{-\frac{Rt}{L}}$$

$$i(T)=i(0)=i(\tau)\cdot e^{-\frac{RT}{L}}$$

$$i(\tau)=\frac{\frac{v_m\cdot\tau}{L}}{1-e^{-\frac{RT}{L}}}$$

If we put $$\frac{RT}{L}=A$$

the mean value $\bar{i}$ of the current $i$ will be:

$$\bar{i}=\frac{1}{T}\int_0^T i(\tau)\cdot e^{-\frac{Rt}{L}}dt=\frac{1-e^{-A}}{A}\cdot i(\tau)$$

The output is:

$$P_{uo}=R\bar{i}^2=R\frac{(1-e^{-A})^2}{A^2}\cdot i(\tau)\cdot\frac{\frac{v_m\cdot\tau}{L}}{1-e^{-A}}=p\cdot v_m\cdot i(\tau)\cdot\frac{1-e^{-A}}{A}$$

Maximum output $P_{uo\,max}$ will thus be obtained when $i(\tau)=i_m$.

$$P_{uo\,max}=\frac{1-e^{-A}}{A}\cdot p\cdot P_m=a_1\cdot p\cdot P_m$$

where $$a_1=\frac{1-e^{-A}}{A}$$

The values of L and R corresponding to A and $P_{uo\,max}$ are:

$$L=\tau.R_m\cdot\frac{1}{1-e^{-A}}$$

$$R=\frac{L.A}{T}=\frac{p.A}{1-e^{-A}}\cdot R_m=\frac{p}{a_1}\cdot R_m$$

R will thus be proportional to the pulse ratio $p$. The inductance L of the coil thus ought to be chosen approximately equal to or somewhat greater than $\tau.R_m$.

Fig. 5 shows $a_1$ as a function of A. The smaller A is, the greater charge remains after the end of the discharging cycle, which deteriorates the frequency characteristic of the device especially at high modulation frequencies. Therefore the value of A ought not to be less than 3, which according to the diagram in Fig. 5 corresponds to a value of about ⅓ for $a_1$. The resistance of the resistor R thus ought to be chosen greater than $3.p.R_m$.

Fig. 4 shows another device according to the invention. One winding 9 of a transformer 8 is connected between the plate 7 of the tube 1 and the plate voltage source. Across the other winding 10 of said transformer there is connected a diode D in series with a load resistor R. In such a case the end of the load resistor R which is not connected to the diode, may be connected to an arbitrary direct voltage, e. g. ground, instead of to the plate voltage source of the plate 2.

The load impedance R needs not necessarily consist of a resistor but may instead consist of a resistive wave filter.

When using trochotrons or similar tubes for distributing the pulses to the different channels in a multiplex system it has been shown, that a device according to the invention has such a good efficiency that a separate amplifier for each channel is unnecessary. These tubes are well suited to this invention, because the plate-current-plate-voltage diagrams of these tubes show a pronounced conformity with the corresponding diagrams of a pentode.

I claim:

1. A demodulator for duration modulated signal pulses comprising electronic tube means having at least a cathode, grid and plate wherein the plate current is substantially independent of the plate voltage when the latter exceeds a predetermined value and the plate current decreases rapidly when the plate voltage falls below said predetermined value, means including a voltage source and a series connected inductor for applying a voltage between said cathode and plate, means for applying duration modulated pulses to said grid, circuit means including a rectifier and a load impedance forming a shunt branch at least for alternating and pulsating currents across said inductor, said rectifier being nonconducting when plate current flows through the tube means, and output terminals for the demodulated signal connected across said load impedance, said inductor having an inductance of the general magnitude of $t.R_m$ where $t$ equals the maximum duration of the pulses and $R_m$ is the ratio between the voltage source minus said predetermined value of the plate voltage and the plate current above said predetermined plate voltage, said load impedance being at least $3.p.R_m$ wherein $p$ is the pulse duty factor.

2. A demodulator according to claim 1 wherein said inductor comprises a transformer having one winding in series with a plate circuit and the other winding connected in series with said rectifier and said load impedance.

3. A demodulator according to claim 2 wherein said load impedance comprises a resistive wave filter.

References Cited in the file of this patent

UNITED STATES PATENTS

| | | |
|---|---|---|
| 2,286,377 | Roberts | June 16, 1942 |
| 2,374,746 | Hansell | May 1, 1945 |
| 2,426,205 | Grieg | Aug. 26, 1947 |
| 2,529,564 | Miller | Nov. 14, 1950 |
| 2,617,027 | Douma | Nov. 4, 1952 |
| 2,662,174 | Rinia | Dec. 8, 1953 |
| 2,699,498 | Guenther | Jan. 11, 1955 |